(12) United States Patent
Flinn et al.

(10) Patent No.: US 9,011,673 B2
(45) Date of Patent: Apr. 21, 2015

(54) METHOD OF FORMING A PARAFFINIC PRODUCT BY THERMAL CRACKING

(71) Applicant: Richard A. Flinn, Pittsburgh, PA (US)

(72) Inventors: Richard A. Flinn, Pittsburgh, PA (US); Alan H. Singleton, Baden, PA (US)

(73) Assignee: Energy Technology Partners, L.L.C., Gibsonia, PA (US)

( * ) Notice: Subject to any disclaimer, the term of this patent is extended or adjusted under 35 U.S.C. 154(b) by 205 days.

(21) Appl. No.: 13/674,997

(22) Filed: Nov. 13, 2012

(65) Prior Publication Data

US 2014/0076779 A1   Mar. 20, 2014

Related U.S. Application Data

(60) Provisional application No. 61/564,318, filed on Nov. 29, 2011.

(51) Int. Cl.
*C10G 9/00* (2006.01)
*C10G 3/00* (2006.01)

(52) U.S. Cl.
CPC .......................................... *C10G 9/00* (2013.01)

(58) Field of Classification Search
CPC ................ C10G 9/00; C10G 2300/10; C10G 2300/1022; C10G 2300/1025; C10G 2300/1081; C10G 2300/1085
USPC ............ 208/106, 950; 518/705, 728; 585/700

See application file for complete search history.

(56) References Cited

U.S. PATENT DOCUMENTS 4,579,986 A * 4/1986 Sie ................................ 585/324

OTHER PUBLICATIONS

ABB Lummus Global, Technical Information Package for Shell Thermal Conversion Technologies, Proposal No. 3-3676, Jun. 20, 1996, 72 pages.
Karimzadeh et al., Feedstock Effects on Selecting the Appropriate Coil Configuration for Cracking Furnaces, World Academy of Science, Engineering, and Technology, 2010, 641-644, vol. 62.
Savu et al., Optimization and Advanced Control for Thermal Cracking Processes, 20th European Symposium on Computer Aided Process Engineering, 2010, 6 pages.

* cited by examiner

*Primary Examiner* — Walter D Griffin
*Assistant Examiner* — Derek Mueller
(74) *Attorney, Agent, or Firm* — The Webb Law Firm

(57) ABSTRACT

The present invention relates to a method of forming a paraffinic product that involves providing a paraffinic feed having an initial average carbon chain length of greater than 20. The paraffinic feed is a product of a gas-to-liquids process, such as a Fischer-Tropsch process. The paraffinic feed is subjected to thermal cracking at elevated temperature and elevated pressure, which results in the formation of a paraffinic product. The paraffinic product has a final average carbon chain length of less than or equal to 20. The paraffinic product is typically liquid at ambient temperature, such as at 25° C.

14 Claims, No Drawings

METHOD OF FORMING A PARAFFINIC PRODUCT BY THERMAL CRACKING

CROSS REFERENCE TO RELATED PATENT APPLICATION

The present application is entitled to and claims priority of U.S. Provisional Patent Application No. 61/564,318 filed on Nov. 29, 2011, the disclosure of which is incorporated herein by reference in its entirety.

FIELD OF THE INVENTION

The present invention relates to a method of forming a paraffinic product that involves, providing a paraffinic feed that is the product of a gas-to-liquids process, and which has an initial average carbon chain length of greater than 20, and subjecting the paraffinic feed to thermal cracking, which results in the formation of a paraffinic product having a final average carbon chain length of less than or equal to 20.

BACKGROUND OF THE INVENTION

Paraffinic products resulting from gas-to-liquids processes can be used as feeds in the formation of various further products, such as diesel fuels and jet fuels. Paraffinic products resulting from gas-to-liquids processes often have relatively high average carbon chain lengths, such as greater than 20, and, as such, are generally solid at ambient temperature, in some cases being wax-like at ambient temperature. As such, further processing of gas-to-liquids products is typically required so as to provide further products having sufficiently reduced average carbon chain lengths. Typically, gas-to-liquids products are shipped from the gas-to-liquids processing facility where they are formed, to a separate facility where they can be subjected to further processing, such as hydrogenation or hydrocracking Prior to further processing, such as hydrocracking, the gas-to-liquids products typically must be heated to convert them to or maintain them in a liquid state. Such heating is done, in some cases, while the gas-to-liquids product is shipped to the separate facility, and/or after the gas-to-liquids product arrives at the separate facility. Maintaining or converting the gas-to-liquids product in a liquid state is typically required before it is subjected to further processing, such as hydrocracking. Transporting, heating, and/or re-heating the gas-to-liquids product can negatively impact the economic costs associated with final paraffinic product, especially if the transport is delayed or is over a substantial distance.

It would be desirable to develop new methods of forming paraffinic products having reduced average carbon chain lengths that can be used as diesel fuels or jet fuels, from gas-to-liquids products that do not require transporting the gas-to-liquids product to a separate facility. It would be further desirable that such newly developed methods not require heating or re-heating the gas-to-liquids product prior to further processing.

SUMMARY OF THE INVENTION

In accordance with the present invention, there is provided a method of forming a paraffinic product comprising (a) providing a paraffinic feed having an initial average carbon chain length of greater than 20, wherein the paraffinic feed is a product of a gas-to-liquids process. The method further comprises (b) subjecting the paraffinic feed to thermal cracking at elevated temperature and elevated pressure, which results in the formation of the paraffinic product. The paraffinic product has a final average carbon chain length of less than or equal to 20.

DETAILED DESCRIPTION OF THE INVENTION

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, 3.5 to 7.8, and 5.5 to 10.

As used herein, the articles "a," "an," and "the" include plural referents unless otherwise expressly and unequivocally limited to one referent.

All numbers expressing quantities of ingredients, reaction conditions, and so forth used in the specification and claims are to be understood as modified in all instances by the term "about."

With some embodiments of the present invention, the term "paraffin" and similar terms, such as paraffins, paraffinic feed, and paraffinic product, means alkanes (including linear and/or branched alkanes) optionally in combination with one or more of cycloalkanes, alkenes, cycloalkenes, and/or alkynes.

With some embodiments of the present invention, the paraffinic feed is substantially solid at ambient temperature, such as at 25° C. The paraffinic feed, with some embodiments, is substantially solid at ambient temperature, such as at 25° C., and is wax-like.

The initial average carbon chain length of the paraffinic feed is, with some embodiments, greater than 20, and typically less than or equal to 150, such as less than or equal to 100, or less than or equal to 80, or less than or equal to 50. With some additional embodiments, the initial average carbon chain length of the paraffinic feed is greater than 20 and less than or equal to 150, such as from 22 to 150, or from 25 to 150, or from 22 to 100, or from 25 to 100, or from 22 to 50, or from 25 to 50, inclusive of the recited values.

The initial average carbon chain length of the paraffinic feed and the final average carbon chain length of the paraffinic product can in each case be determined in accordance with art-recognized analytical methods. Such art-recognized analytical methods include, but are not limited to, gas chromatography, gas chromatography coupled with mass spectrometry, and near-infrared spectroscopy.

In accordance with some embodiments, the final average carbon chain length of the paraffinic product is greater than 5. With some further embodiments, the final average carbon chain length of the paraffinic product is less than or equal to 20. The final average carbon chain length of the paraffinic product can, with some embodiments, be greater than 5 and less than or equal to 20, or greater than 5 and less than or equal to 15, or greater than 5 and less than or equal to 10. The final average carbon chain length of the paraffinic product can, with some embodiments, be from 10 to 20, or from 6 to 20, or from 6 to 15, or from 6 to 10, inclusive of the recited values.

In accordance with some embodiments, the paraffinic product is liquid at ambient temperature, such as at 25° C. With some further embodiments, the paraffinic product has a viscosity at 25° C. of less than or equal to 5000 millipoise, such as from 1000 millipoise to 5000 millipoise. With some additional embodiments, the paraffinic product is pumpable (or capable of being pumped) at ambient temperature, such as at 25° C., such as with any art-recognized pumping device or devices used in conjunction with petroleum refining. Examples of such art-recognized pumping devices include, but are not limited to, rotary gear pumps; or enclosed impeller pumps; or variable capacity vane pumps; centrifugal pumps; or centrifugal, end suction, enclosed impeller pumps.

The gas-to-liquids process from which the paraffinic feed is prepared can be selected from any suitable gas-to-liquid process, including but not limited to art-recognized gas-to-liquids processes. With some embodiments, the gas-to-liquids process is a Fischer-Tropsch process. The Fisher-Tropsch process can involve the art-recognized catalytic conversion of carbon monoxide in the presence of hydrogen gas to hydrocarbons including paraffins.

With some embodiments, the Fischer-Tropsch process is conducted using a Fischer-Tropsch feed comprising natural gas, which comprises methane. The natural gas can, with some embodiments, be converted to carbon monoxide and hydrogen, which is then further converted to paraffins.

The product of the Fischer-Tropsch process is, with some embodiments, used directly without further processing as the paraffinic feed. With further embodiments, the product of the Fischer-Tropsch process is subjected to further processing steps, such as fractionating steps, which results in formation of the paraffinic feed.

The Fischer-Tropsch process can result in the formation of a number of sequential let-downs, in which each successive let-down typically has an average carbon chain length that is less than the preceding let-down. In accordance with some embodiments, the paraffinic feed is a first let-down of the Fischer-Tropsch process.

The paraffinic feed, in accordance with some embodiments, is substantially free of aromatic hydrocarbons and contains less than 0.5 percent by weight, or less than 0.1 percent by weight, or less than 0.05 percent by weight of aromatic hydrocarbons. In accordance with some further embodiments, the paraffinic feed is free of aromatic hydrocarbons.

The paraffinic product, in accordance with some embodiments, is substantially free of aromatic hydrocarbons and contains less than 0.5 percent by weight, or less than 0.1 percent by weight, or less than 0.05 percent by weight of aromatic hydrocarbons. In accordance with some further embodiments, the paraffinic product is free of aromatic hydrocarbons.

With some embodiments, the paraffinic feed is provided from the gas-to-liquids process in a liquid form, and in the absence of the paraffinic feed becoming solid after the gas-to-liquids process. The paraffinic feed is provided, with some embodiments, from the gas-to-liquids process in a liquid form, in the absence of the paraffinic feed becoming solid after the gas-to-liquids process, and in the absence of introducing additional thermal energy into the paraffinic feed prior to subjecting the paraffinic feed to thermal cracking. With some further embodiments, the paraffinic feed, as provided in the present process, retains a residual heat temperature from the gas-to-liquid process that is above the melting point of the paraffinic feed, and is free of the introduction of additional thermal energy into the paraffinic feed prior to subjecting the paraffinic feed to thermal cracking. The paraffinic feed is, in accordance with some embodiments, provided in a liquid form directly from the gas-to-liquids process to the thermal cracking step of the present method.

The method of the present invention involves subjecting the paraffinic feed to thermal cracking at elevated temperature and elevated pressure. Thermal cracking can be conducted in a suitable reactor or assembly of one or more reactors and auxiliary equipment, which can be referred to as a thermal cracking facility. With some embodiments, a coil-type or soaker-type thermal cracking facility is used. For purposes of non-limiting illustration, a thermal cracking facility that can be used with the method of the present invention includes a heater, a soaker, an optional cyclone, a fractionator, and an optional vacuum flasher.

The temperature, residence time, and pressure under which thermal cracking is conducted are each selected, with some embodiments, so as to result in the formation of a paraffinic product that is liquid at ambient temperature, but which has an average carbon chain length that is greater than 5, such as: greater than 5 and less than or equal to 20, or greater than 5 and less than or equal to 15, or greater than 5 and less than or equal to 10; or from 10 to 20, or from 6 to 20, or from 6 to 15, or from 6 to 10, inclusive of the recited values.

With some embodiments, the thermal cracking step of the method of the present invention is performed in the absence of a catalyst, such as catalysts used in catalytic cracking, hydrogenation, and/or hydrocracking Examples of catalysts, that the thermal cracking step is performed in the absence of, with some embodiments, include, but are not limited to, supported catalysts, such as acid catalysts supported on a solid support selected from silica, alumina, and aluminosilicate (referred to a zeolites), and combinations of two or more thereof, such as silica-alumina. With some embodiments, the thermal cracking step of the method of the present invention is distinguishable from and does not involve catalytic cracking, hydrogenation, hydrocracking, or steam cracking.

The elevated temperature, under which the method of the present invention is conducted, is typically greater than ambient (or room) temperature, such as greater than 25° C. With some embodiments, the elevated temperature is from 200° C. to 600° C., or from 200° C. to 500° C., or from 250° C. to 450° C., or from 300° C. to 400° C. inclusive of the recited temperature values.

With some embodiments, the thermal cracking step of the method of the present invention is conducted under conditions of elevated pressure. The elevated pressure, under which the method of the present invention can be conducted, is typically greater than ambient atmospheric pressure, such as greater than 14 psi (greater than 96 kilopascals) or greater than 15 psi (greater than 103 kilopascals). With some embodiments, the elevated pressure is from 300 to 2000 psi (2.1 to 13.8 megapascals). With some embodiments, the elevated pressure, under which the method of the present invention is conducted, is from 400 to 1500 psi (2.8 to 10.3 megapascals), or from 500 to 1000 psi (3.5 to 6.9 megapascals), or from 600 to 900 psi (4.1 to 6.2 megapascals), inclusive of the recited values.

For purposes of illustration, a non-limiting prophetic description of the method of the present invention is provided as follows. A Fischer-Tropsch process is operated with a feed of natural gas and produces a Fischer-Tropsch paraffinic product, which is a first let-down of the Fischer-Tropsch process, at a rate of 1000 to 100,000 US barrels (liquid) per day (119 kiloliters (KL) to 11,924 KL per day). The Fischer-Tropsch paraffinic product is liquid, has an average temperature of from 93° C. to 316° C. (200° F. to 600° F.), and has an initial average carbon chain length of from 22 to 50. The Fischer-Tropsch paraffinic product is used as the paraffinic feed of the method of the present invention, and is fed in liquid form at a temperature of 93° C. to 316° C. (200° F. to 600° F.) (without the introduction of additional heat energy thereto) directly from the Fischer-Tropsch process to a coil-type thermal cracking facility at a rate of 1000 to 100,000 US barrels (liquid) per day (119 KL to 11,924 KL per day). The reactor of the coil-type thermal cracking facility is operated at a temperature of 200° C. to 600° C. and an elevated pressure of 2.1 to 13.8 megapascals. A paraffinic product having a final average carbon chain length of from 10 to 20 is obtained from the thermal cracking reactor at a rate of 1000 to 100,000 US barrels (liquid) per day (119 KL to 11,924 KL per day). The paraffinic product is liquid at 25° C.

The present invention has been described with reference to specific details of particular embodiments thereof. It is not intended that such details be regarded as limitations upon the scope of the invention except insofar as and to the extent that they are included in the accompanying claims.

What is claimed is:

1. A method of forming a paraffinic product comprising:
   (a) providing a paraffinic feed having an initial average carbon chain length of greater than 20, wherein said paraffinic feed is a product of a gas-to-liquids process; and
   (b) subjecting the paraffinic feed to thermal cracking at elevated temperature and elevated pressure, thereby resulting in the formation of said paraffinic product, wherein said paraffinic product has a final average carbon chain length of less than or equal to 20.

2. The method of claim 1 wherein said paraffinic feed is substantially solid at 25° C.

3. The method of claim 1 wherein said paraffinic product is liquid at 25° C.

4. The method of claim 1 wherein said initial average carbon chain length is greater than 20 and less than or equal to 150.

5. The method of claim 1 wherein said final average carbon chain length is greater than 5.

6. The method of claim 1 wherein said final average carbon chain length is greater than 5 and less than or equal to 20.

7. The method of claim 1 wherein said final average carbon chain length is from 10 to 20.

8. The method of claim 1 wherein said final average carbon chain length is from greater than 5 and less than or equal to 15.

9. The method of claim 1 wherein said gas-to-liquids process is a Fischer-Tropsch process.

10. The method of claim 9 wherein said Fischer-Tropsch process is conducted using a Fischer-Tropsch feed comprising natural gas.

11. The method of claim 9 wherein said paraffinic feed is a first let-down of said Fischer-Tropsch process.

12. The method of claim 1 wherein said paraffinic product is substantially free of aromatic hydrocarbons.

13. The method of claim 1 wherein said paraffinic feed is provided from said gas-to-liquids process in a liquid form, in the absence of said paraffinic feed becoming solid after said gas-to-liquids process.

14. The method of claim 1 wherein said elevated temperature is from 200° C. to 600° C., and said elevated pressure is from 2.1 to 13.8 megapascals.

* * * * *

UNITED STATES PATENT AND TRADEMARK OFFICE
CERTIFICATE OF CORRECTION

| | | |
|---|---|---|
| PATENT NO. | : 9,011,673 B2 | Page 1 of 1 |
| APPLICATION NO. | : 13/674997 | |
| DATED | : April 21, 2015 | |
| INVENTOR(S) | : Richard A. Flinn et al. | |

It is certified that error appears in the above-identified patent and that said Letters Patent is hereby corrected as shown below:

In the claims

Column 6, Lines 24-26, delete Claim 14 "The method of claim 1 wherein said elevated temperature is from 200° C. to 600° C., and said elevated pressure is from 2.1 to 13.8 megapascals."

Signed and Sealed this
Thirteenth Day of October, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,011,673 B2 | Page 1 of 1 |
| APPLICATION NO. | : 13/674997 | |
| DATED | : April 21, 2015 | |
| INVENTOR(S) | : Richard A. Flinn et al. | |

It is certified that error appears in the above-identified patent and that said Letters Patent is hereby corrected as shown below:

Title page, 14 Claims should read 13 Claims

In the claims

Column 6, Lines 24-26, delete Claim 14 "The method of claim 1 wherein said elevated temperature is from 200° C. to 600° C., and said elevated pressure is from 2.1 to 13.8 megapascals."

This certificate supersedes the Certificate of Correction issued October 13, 2015.

Signed and Sealed this
First Day of December, 2015

Michelle K. Lee
*Director of the United States Patent and Trademark Office*